United States Patent
Lavi et al.

(10) Patent No.: US 11,941,110 B2
(45) Date of Patent: *Mar. 26, 2024

(54) PROCESS PRIVILEGE ESCALATION PROTECTION IN A COMPUTING ENVIRONMENT

(71) Applicant: Palo Alto Networks, Inc., Santa Clara, CA (US)

(72) Inventors: Yaron Lavi, Tel-Aviv (IL); Eldar Aharoni, Holon (IL); Elad Wexler, Givatym (IL)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/136,254

(22) Filed: Apr. 18, 2023

(65) Prior Publication Data

US 2023/0252130 A1 Aug. 10, 2023

Related U.S. Application Data

(63) Continuation of application No. 17/182,104, filed on Feb. 22, 2021, which is a continuation of application No. 15/967,356, filed on Apr. 30, 2018, now Pat. No. 10,984,098.

(60) Provisional application No. 62/654,026, filed on Apr. 6, 2018.

(51) Int. Cl.
*G06F 21/54* (2013.01)
*G06F 21/44* (2013.01)

(52) U.S. Cl.
CPC .............. *G06F 21/54* (2013.01); *G06F 21/44* (2013.01); *G06F 2221/033* (2013.01)

(58) Field of Classification Search
CPC ..... G06F 2221/033; G06F 21/44; G06F 21/54
USPC ............................................................ 726/1
See application file for complete search history.

(56) References Cited

U.S. PATENT DOCUMENTS

| | | | |
|---|---|---|---|
| 7,418,734 B2 | 8/2008 | Berg | |
| 8,950,007 B1 | 2/2015 | Teal | |
| 9,386,027 B2 | 7/2016 | Luyi | |
| 10,255,433 B2 | 4/2019 | Takacs | |
| 2008/0104665 A1 | 5/2008 | Naldurg | |
| 2014/0331279 A1 | 11/2014 | Aissi | |
| 2015/0220455 A1 | 8/2015 | Chen | |

(Continued)

OTHER PUBLICATIONS

CVE—2016-5195 downloaded Apr. 4, 2018.

(Continued)

*Primary Examiner* — Bryan F Wright
(74) *Attorney, Agent, or Firm* — Van Pelt, Yi & James LLP

(57) ABSTRACT

Techniques for process privilege escalation protection in a computing environment are disclosed. For example, the disclosure describes a system/process/computer program product for process privilege escalation protection in a computing environment that includes monitoring a process executed on a computing device, detecting an unauthorized change in a token value associated with the process, and performing an action based on a policy (e.g., a kernel protection security policy/rule(s), which can include a whitelisted set of processes and/or configured actions/responses to perform for other/non-whitelisted processes) in response to an unauthorized change in the token value associated with the process.

24 Claims, 7 Drawing Sheets

(56) References Cited

U.S. PATENT DOCUMENTS

| | | | |
|---|---|---|---|
| 2016/0044049 A1* | 2/2016 | Xing | H04L 63/14 726/23 |
| 2016/0232354 A1 | 8/2016 | Fraser | |
| 2016/0381026 A1 | 12/2016 | Silva Pinto | |
| 2017/0289191 A1 | 10/2017 | Thioux | |
| 2018/0276383 A1 | 9/2018 | Venkataramani | |
| 2019/0081983 A1 | 3/2019 | Teal | |

OTHER PUBLICATIONS

CVE-2015-1701 Win32k LPE vulnerability used in APT attack. downloaded Apr. 5, 2018.
CVE-2015-1701 Windows ClientCopyImage Win32K Exploit Rapid7. downloaded Apr. 5, 2018.
Fireeye Labs. Operation Russian Doll: Adobe & Windows Zero-Day Exploits Likely Leveraged by Russia's APT28 in Highly-Targeted Attack. Apr. 18, 2015. downloaded Apr. 5, 2018.
Kernel Patch Protection—Wikipedia. downloaded Apr. 2, 2018.
Microsoft Blog. An Introduction to Kernel Patch Protection—Windows Vista Security. Sep. 10, 2017.
NVD—CVE-2015-1701. National Vulnerability Database. downloaded Apr. 5, 2018.
NVD—CVE-2016-1828. National Vulnerability Database. downloaded Apr. 4, 2018.
NVD—CVE-2016-5195. National Vulnerability Database. downloaded Apr. 4, 2018.

* cited by examiner

Exploit Protection - Privilege Modification Protection

General | Host | Condition | Process* | Settings* — 420

◯ Active

Action: Block and notify user ▼ — 422
Block
Alert
— 424

Exclusions —
C:\Program Files (x86)\Symantec\Symantec Endpoint Protection\*?\Bin\cc_SvcHst.exe ⊕ Add 🗑 Delete

[OK]  [Cancel]

FIG. 4B

PROCESS PRIVILEGE ESCALATION PROTECTION IN A COMPUTING ENVIRONMENT

CROSS REFERENCE TO OTHER APPLICATIONS

This application is a continuation of U.S. patent application Ser. No. 17/182,104 entitled PROCESS PRIVILEGE ESCALATION PROTECTION IN A COMPUTING ENVIRONMENT filed Feb. 22, 2021, which is a continuation of U.S. patent application Ser. No. 15/967,356, now U.S. Pat. No. 10,984,098, entitled PROCESS PRIVILEGE ESCALATION PROTECTION IN A COMPUTING ENVIRONMENT filed Apr. 30, 2018, which claims priority to U.S. Provisional Patent Application No. 62/654,026 entitled PRIVILEGE ESCALATION PROTECTION filed Apr. 6, 2018, all of which are incorporated herein by reference for all purposes.

BACKGROUND OF THE INVENTION

Security risks on computing devices are often a result of a bug, design flaw, or other vulnerability in an operating system being exploited to gain elevated access to resources that are normally protected from an application/process or user. The result is an application/process with more privileges that can perform unauthorized actions.

Nefarious individuals and organizations are increasingly targeting privilege escalation with malicious applications/processes ("malware"). Unfortunately, it can be difficult to protect against privilege escalation using existing techniques.

BRIEF DESCRIPTION OF THE DRAWINGS

Various embodiments of the invention are disclosed in the following detailed description and the accompanying drawings.

FIGS. 4A and 4B are diagrams of a user interface for performing privilege escalation protection in accordance with some embodiments.

DETAILED DESCRIPTION

Figure 1:
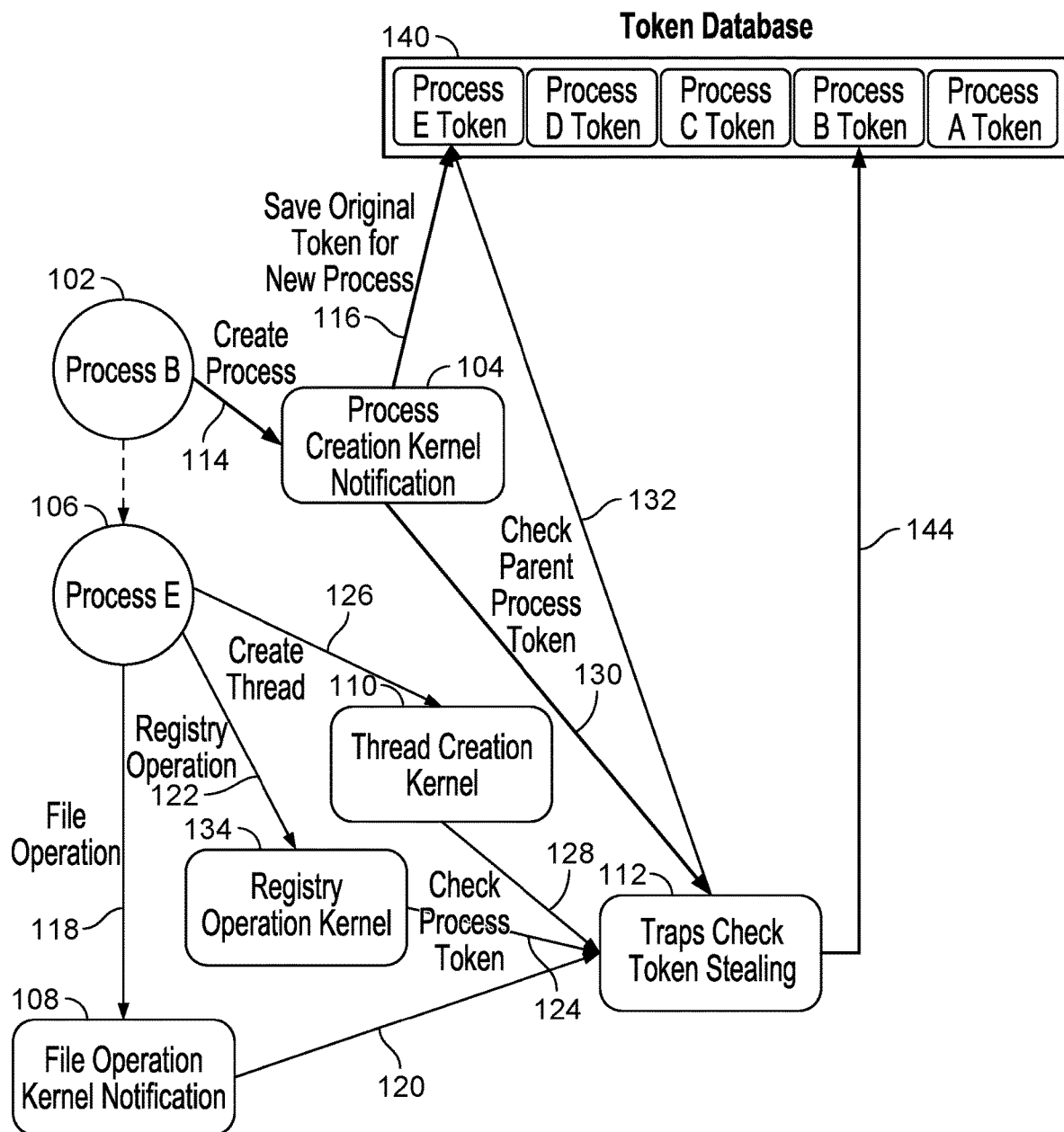
FIG. 1 is a diagram of a system for performing privilege escalation protection in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Privilege Escalation Security Risks

Security risks on computing devices are often a result of a bug, design flaw, or other vulnerability in an operating system (OS) being exploited to gain elevated access to resources that are normally protected from an application/process or user. The result is an application/process with more privileges that can perform unauthorized actions (e.g., as part of an Advanced Persistent Threat (APT) or other attack or unauthorized activity by malware or a user).

Nefarious individuals and organizations are increasingly targeting privilege escalation with malicious applications/processes ("malware"). Unfortunately, privilege escalation (e.g., SYSTEM/kernel privilege escalation) is a challenging technical security problem that affects various OS environments/platforms (e.g., Microsoft Windows® OS, Apple Mac® OS and iOS®, Linux OS, and various other OS environments/platforms). For example, prior security approaches that utilized hooking functions in/patching the kernel were disallowed as of Windows Vista and later versions under Microsoft's Kernel Patch Protection (e.g., also informally known as PatchGuard) policy.

In recent years, kernel exploits have become more common and such threats have increased. As such, this trend imposes a security threat on present and potential future versions of endpoint devices (e.g., laptop/desktop computers, gaming consoles, set-top boxes, tablets, smart phones, and/or other mobile devices, and servers), which is not effectively and efficiently detected and prevented by existing security solutions. For example, a common kernel exploitation technique is to run code in a stealing process (e.g., an attacker executing code using a remote user exploit or some local exploit) that would "steal" (e.g., copy for reuse) the token (e.g., token value/ID) of a privileged process (e.g., a SYSTEM process on Microsoft Windows OS or a kernel process on an Apple Mac OS or Linux OS environment) after executing a kernel exploit, and modify an assigned token value/ID of a malicious process with the stolen token value/ID allowing the malicious process to run with such privileges (e.g., SYSTEM permissions on a Microsoft Windows OS/in the kernel on an Apple Mac OS or Linux OS environment). As such, the ability to identify and block such attacks would facilitate a technical security solution for preventing various kernel exploits for privilege escalation.

Freezing Primary Tokens in Processes

On the Microsoft Windows OS, a process is created with a primary access token (e.g., also referred to as a primary token), set in accordance to the identity of its creator. Even after the process creation is finished, the primary token may still be legitimately changed, until a certain point in the lifetime of the process. From this point forward, the token, for all intended purposes, is considered a frozen token, and there is no legitimate way to change it (e.g., any further changes to the frozen token are an indicia of illegal/unauthorized changes, which may be a result of a token stealing activity) as further described below.

The primary token of a process is set at the initialization of the process in kernel mode. For example, on Windows XP, when the process is created, the parent's token is duplicated and used in the initialization. If a user requires a different token for the process, then it would create the process as suspended, and set the new token using the NtSetInformationProcess, before resuming the main thread.

For example, a common attack on various OS environments/platforms is a low privileged process that manages to execute SYSTEM/kernel code using an exploit, and changes the same process's token, so that other actions performed by it would be privileged. As such, nefarious individuals and organizations targeting privilege escalation with malicious applications ("malware") can utilize this mechanism to change the token during execution of the process using a stolen token (e.g., copying a token associated with a SYSTEM process, such as the winlogon process on Microsoft Windows OS platforms).

Thus, new and improved technical security solutions to protect against privilege escalation are needed. Moreover, new and improved techniques are needed to detect and prevent such token stealing mechanisms that can be utilized for privilege escalation by malware or other unauthorized activities or users.

Overview of Techniques for Providing Privilege Escalation Protection

Various techniques for privilege escalation protection are disclosed. For example, various techniques for privilege escalation protection are disclosed on several different OS environments/platforms.

Many kernel exploits are executed as privileged user mode by stealing tokens (e.g., kernel to user approach used by malware). As such, various techniques are disclosed for detecting token stealing to detect and prevent such kernel to user malware attacks.

In some embodiments, a system/process/computer program product for privilege escalation protection includes monitoring a process executed on a computing device, detecting an unauthorized change in a token value associated with the process, and performing an action based on a policy (e.g., a kernel protection security policy/rule(s), which can include a whitelisted set of processes and/or configured actions/responses to perform for other/non-whitelisted processes) in response to an unauthorized change in the token value associated with the process.

For example, the disclosed techniques can be applied to detect a privilege escalation that is a result of a stealing process (e.g., a process that steals tokens from a privileged process and writes over the given/assigned token value for a malicious process) that steals/reuses a token value/ID associated with a privileged process (e.g., Windows Logon Application or another privileged process, such as a process with SYSTEM privileges executed on the Windows OS environment, or another privileged/kernel process on another OS environment) to elevate the privileges of the malicious process (e.g., a process that had its token changed/modified to a value/ID of the privileged process).

In some embodiments, a system/process/computer program product for privilege escalation protection further includes detecting an attempt to change the token value/ID associated with the process to a value that is associated with another process (e.g., that has kernel privileges) executed on the computing device.

In some embodiments, a system/process/computer program product for privilege escalation protection further includes caching an initial token value associated with the process (e.g., storing the initial token in a token cache to facilitate detection of unauthorized changes of the token value, such as after the token is frozen and using a token value/ID that matches that of a different, privileged process executed on the endpoint device).

In some embodiments, a system/process/computer program product for privilege escalation protection further includes checking for token value changes in response to one or more trigger events (e.g., a new process creation, a thread creation, a registry operation, a file operation, and/or other system/file/other events).

In some embodiments, a system/process/computer program product for privilege escalation protection further includes performing a protection action based on the policy in response to the unauthorized change in the token value associated with the process. For example, the protection action can include killing the process based on the policy in response to the unauthorized change in the token value associated with the process. As another example, the protection action can include generating an alert based on the policy in response to the unauthorized change in the token value associated with the process.

As further described below, a privilege escalation protection solution (e.g., also referred to herein as PEP) is disclosed for preventing exploits of the operating system kernel for privilege escalations. The PEP prevents an attacker from using the privilege credentials of another process with greater privileges to run a process with system permissions (e.g., SYSTEM/kernel privileges). For example, PEP can be implemented on endpoints (e.g., running Windows OS, Mac OS/iOS, and/or Linux OS environments) to prevent a process from running if the process has obtained token related credentials from another process to attempt to run the process with system permissions. Also, a process can also be whitelisted if it legitimately uses the privilege information of another process to run with system permissions (e.g., configurable in a policy for PEP, such as on a Windows OS environment).

In some embodiments, PEP can be configured to perform various actions in response to detecting an unauthorized privilege escalation on an endpoint. For example, when PEP detects an attempt to exploit the operating system kernel, then a security policy can be enforced, such as to block the behavior (e.g., a prevention/protection rule/policy), or permit the behavior and log the monitored activities/behaviors (e.g., a notification rule/policy, which can also include a user alert and/or system/network/security administrator alert/notification).

In some embodiments, PEP can be configured to define the target objects to which to apply the exploit protection rule/policy. A new rule/policy can be configured to apply to all objects in an organization or to apply to a subset of target objects (e.g., one or more users, computers, groups, organizational units, or existing endpoints in the specified areas). For example, an endpoint security manager can query Active Directory to verify the users, computers, groups, or organizational units or identifies existing endpoints from previous communication messages.

In some embodiments, PEP can include a user interface for configuring and viewing security events triggered by PEP. For example, the above-described configuration of the PEP settings and rules/policies can be configured using the user interface (e.g., a graphical user interface (GUI)). As another example, prevention events and/or notification-only events as well as logs can be viewed using the user interface. In an example implementation, each security event identifies the parent (source) process that attempted to steal privilege information, parent process user, and the child (target) process in the attack.

These and other embodiments for performing privilege escalation protection techniques will now be further described below.

System Embodiments for Performing Privilege Escalation Protection

FIG. 1 is a diagram of a system for performing privilege escalation protection in accordance with some embodiments. As shown, FIG. 1 provides an example workflow and components of a system for performing privilege escalation protection in accordance with some embodiments. In some embodiments, the disclosed system is implemented as a module/component of an endpoint agent (e.g., a user mode application executed on an endpoint device). In an example implementation, the endpoint agent can be provided by a lightweight agent (e.g., a commercially available endpoint agent, such as the Palo Alto Networks® Traps™ agent available from Palo Alto Networks, Inc., which is a highly scalable, lightweight agent for endpoint security) that can be executed on, for example, a variety of different client/host device platforms (e.g., Microsoft® Windows® OS platforms for clients and/or servers, and/or on other OS platforms, such as the Apple Mac® OS, Apple iOS®, and/or Linux OS) to facilitate endpoint security and privilege escalation protection, such as further described below.

The disclosed system embodiments can detect privilege escalation exploits (e.g., unauthorized SYSTEM/kernel privilege escalation) and perform responsive action(s) (e.g., prevention, alert, user notification, monitor and log, etc.). Specifically, the disclosed system embodiments can detect privilege escalation exploits and perform responsive action(s) without hooking functions in the kernel (e.g., without patching the kernel on a Microsoft Windows OS, and as a result, without the need to bypass PatchGuard on the Microsoft Windows OS).

The disclosed techniques for privilege escalation protection can prevent memory-corruption exploits; in the privilege escalation case those exploits execute in the kernel of the OS. As similarly discussed above, on the current and more recent versions of Microsoft Windows OS, PatchGuard prevents any product (e.g., security applications executed on the Microsoft Windows OS, which generally are executed in user mode) from hooking kernel functions, and hence, security logic for kernel functions generally cannot be triggered by such applications executed in user mode. Also, kernel memory corruption exploits, which are local privilege escalations, generally include the following stages of operations: (1) triggering a vulnerability (e.g., in order to trigger execution of kernel shellcode); (2) executing kernel shellcode (e.g., to steal a token associated with a privileged/SYSTEM process); and (3) executing privileged user shellcode (e.g., using the stolen/copied token). Thus, the disclosed techniques facilitate a user mode privilege escalation protection solution (PEP).

The disclosed user mode privilege escalation protection techniques can block a plurality of stages of the above-described user mode exploits, as well as the shellcode stage. For example, the disclosed user mode privilege escalation protection techniques can prevent the last stage of running privileged user shellcode as described above.

There are different methodologies for exploit to execute privileged user mode code such as similarly described above. A common payload of a local privilege escalation exploit is the token stealing method.

As such, the disclosed user mode privilege escalation protection techniques detect the token stealing operation after it is completed but before any privileged user mode operation occurs in user mode. In an example implementation on a Microsoft Windows OS, detecting the token stealing operation after it is completed but before any privileged user mode operation occurs in user mode can be implemented by registering to Windows kernel notification events that are triggered when the following operations/events occur: process creation, thread creation, registry operation, and file operation. Subsequently, whether the process's token is the same as it was when the process was created, or if it has been changed, can be determined and an appropriate response/action can be performed (e.g., a prevention response/action can be performed, such as based on a configured policy/rule).

As discussed above, in a Windows OS environment, a process is generally created with a primary access token (e.g., primary token), given to it by its creator. Even after the process creation is finished, the primary token may still be legitimately changed, until a certain point in the lifetime of the process. In that point in time, the token is, for all intended purposes, considered a "Frozen Token," and there generally is no legitimate way to change it.

In some embodiments, the endpoint agent monitors processes for changes in their primary access token, once it has been frozen. By default, all processes will be protected by the endpoint agent. For example, the change of a frozen token of a process is identified no later than the time one of the following operations/events is detected: (1) the malicious process creates a new process; (2) the malicious process creates a new thread (e.g., either in itself or in a different process); (3) the malicious process performs a registry operation; and (4) the malicious process opens a file handle. Consequently, detecting that the malicious process opens a file handle will prevent a malicious process from performing the following file related actions: reading or writing into a file, creating a new file/directory, moving a file/directory, deleting a file/directory, and/or setting Access Control Lists (ACLs) for a file/directory. Similarly, detecting that the malicious process opens a registry handle will prevent a malicious process from performing the following registry related actions: reading or writing a new key/value, creating a new key/value, renaming a key/value, deleting a key/value, and/or setting ACLs for a key. Also, these PEP techniques can similarly detect if the malicious process performs the following registry related actions: loads/unloads a key in the registry (e.g., in Vista and later versions of Microsoft Windows OS), and/or restores a key in the registry (e.g., in Vista Service Pack 2 (SP2) and later versions of Microsoft Windows OS).

As further described below, upon identification of a changed/modified frozen token associated with a process (e.g., a malicious process), the endpoint agent raises a privilege escalation protection. The source process for the prevention is the malicious process. As also further described below, a policy can include a white-list, per source process with the name A, of the path's pattern for processes which A is allowed to steal tokens from and for such cases, no prevention is raised. For example, if no process is found to be associated with the changed token, then the endpoint agent determines whether to raise a privilege escalation protection (e.g., on Vista and later versions of Microsoft Windows OS: a prevention is raised; however, on Microsoft Windows XP/2003: no prevention is raised given that on XP/2003 the operating machine does not actively prohibit token changes even after the token is "frozen"). As also described further below, in an example implementation, an Administrator (e.g., system/network/security Admin) can disable the protection of the endpoint agent per specific source processes (e.g., by name).

Triggers for Token Checking

As discussed above, the actual token can be changed unlawfully without any regards to the process life time (e.g., assuming it is still alive, and the frozen token is already set). In an example implementation on the Microsoft Windows OS, the following callback interfaces can be utilized as a place holder to check for an incorrect/unauthorized token: (1) process creation notification; (2) thread creation notification; (3) registry callback; and (4) file system interaction callback. Each of these interfaces (e.g., APIs) is further described below.

The process creation notification interface can be called to determine if the token for the parent process has been changed/modified.

The thread creation notification can be called when a process A creates a thread inside itself. The thread creation notification can also be called when a process A creates a thread inside another process B. In either case, the thread creation notification can be called to determine if the token for process A has been changed/modified.

Additional example triggers for token checking that can be performed will now be described. Another example trigger for performing a checkup of the token (e.g., whether it was changed/modified) can include opening a process/thread handle (e.g., availability of trigger is Vista+ on the Microsoft Windows OS). Another example trigger for performing a checkup of the token (e.g., whether it was changed/modified) can include opening a handle to a pipe/mailslot. As will now be apparent, various other triggers for performing a checkup of the token (e.g., whether it was changed/modified) can be performed on Microsoft Windows OS or other OS environments.

These interfaces/triggers can be utilized in the example diagram and workflow of FIG. 1 as further described below.

Detection of Token Stealing

Referring to FIG. 1, FIG. 1 is a diagram of a system for performing privilege escalation protection in accordance with some embodiments. Specifically, FIG. 1 illustrates an example workflow and components of a system for performing anti-token stealing/privilege escalation protection that includes various interfaces/triggers for token verification checkpoints as will now be further described. As an initial operation, the endpoint agent registers for various notifications of a new process (e.g., registering for various notifications in a Windows OS environment, such as using the following callback interfaces as a place holder to check for an incorrect/unauthorized token: (1) process creation (kernel) notification; (2) thread creation notification; (3) registry (operation kernel) callback; (4) file system interaction(/operation kernel) callback(/notification) (e.g., which can be implemented using a filter driver), as similarly described above). As shown at 114, the endpoint agent receives a process creation kernel notification 104 when Process B 102 creates a new Process E 106. When a new process is created (e.g., Process E in this example), then the endpoint agent performs a lookup of the primary token value (e.g., unique value/ID for the original token for Process E, such as by performing an OS API call, such as a Windows API can be used to access the token field in the eprocess data structure to fetch the value of the primary token for the process executed on a Windows OS). The primary token value is then added to a list of all process tokens as shown at 116 (e.g., save original token (fetched primary token value) for the new Process E), which are cached/stored in a token database 140 (e.g., Process B Token (previously cached/stored) and Process E token are cached/stored in the token database as shown, in which the token database can be implemented using a table or other data store format). At 130 and 144, the endpoint agent similarly performs a lookup of the parent process token (e.g., Process B in this example), which is cached as Process B token in token database 140.

As also shown in FIG. 1, other examples for the endpoint agent to perform token verification include the following events: file operation (118), registry operation (122) (e.g., changes to registry), create thread (126) (e.g., local for a new thread for itself/its own process A), and create thread (e.g., remote for another process E). At 120, 124, and 128, for file operation kernel notifications 108, registry operation kernel notification 134, and thread creation kernel notification 110, respectively, the endpoint agent (e.g., Traps agent) performs a check token stealing operation as shown at 112. Specifically, the endpoint agent performs an OS API call again to look-up the primary token value (unique value/ID) for Process E as shown at 132. The endpoint agent verifies whether the fetched primary token value (unique value/ID) for Process E matches the previously cached value or if it was modified/changed after being frozen as shown at 112 and 132.

In an example implementation, the endpoint agent similarly caches tokens associated with each of the processes executing on the OS/system in token database 140 (e.g., Process A token, Process B token, Process C token, Process D token, and Process E token as shown in FIG. 1). If the Process E token was not changed, then the no response/action is performed. If during one of the above described triggers for token verification checkpoints it is determined that the Process E token was changed and matches the value of a token associated with another process (e.g., token stealing was detected), then a privilege escalation protection operation (e.g., action/response) can be performed based on a configuration or a security policy/rule.

In this example implementation, to detect token stealing/unauthorized changes/modifications to token values associated with a process, traps check token stealing operation 112 determines whether the token was changed/modified after it was frozen. For example, if the Process E token was changed to a token value/ID that did not match the token value/ID already cached/stored in the token database for another process, then the new token value for that process is cached/stored in the token database, and the Process E token is marked as frozen (e.g., a flag value in the cache table can be set to indicate that the process token is now frozen). Typically, on the Windows OS, the primary token value is set when the process is created and is a unique value (e.g., and should be frozen/immutable). However, the value of the primary token associated with the process can be changed using the API up to the moment the first thread associated with the process is started to execute. As such, the above described token value/ID verification can be performed to check whether the token value/ID is changed after it should have been frozen. Frozen tokens are further described above.

As such, for these example kernel event notifications described above (e.g., including process creations, thread creations, registry operations, and file operations), the endpoint agent can detect token stealing and raise a privilege escalation protection, such as further described below.

Raising a Privilege Escalation Protection

As described above, most kernel exploits are executed as privileged user mode by stealing tokens (e.g., kernel to user approach used by malware). In a token stealing scenario, there are several processes as will now be described. The stealing process refers to the process (e.g., kernel shellcode running inside the malicious process) that does the action of reading a privileged process token (e.g., token value/ID) and copying it to another process. The malicious process refers to the process (e.g., user mode shellcode) that had its token (e.g., token value/ID) changed (e.g., changed to the copied/stolen token value/ID). In some cases, this malicious process can be the same as the stealing process. The privileged process refers to the process whose token was stolen (e.g., a process with high privileges that will be exploited by the malicious process). The disclosed techniques for detecting token stealing can be performed to detect and prevent such kernel to user malware attacks by raising a privilege escalation protection and performing a configured operation as further described below.

In this example implementation, upon a trigger that detects token stealing, the endpoint agent (e.g., a privilege escalation protection module of a security agent executed on an endpoint device) checks if the policy (e.g., security policy/rule) enables anti-token stealing (e.g., turns on the disclosed privilege escalation protection security feature), and proceed only if so. If the anti-token stealing feature is enabled, and if it is determined that a frozen token was changed/modified, then the endpoint agent checks the privileged process from which the token was taken against a white-list (e.g., check if the copied/stolen token value/ID is on a whitelist). If after the whitelist check, it is determined to not raise a prevention, then the process is marked as one for which the endpoint agent will not check the token anymore.

In cases where a prevention is raised, and the terminate value in the configuration was set to FALSE (e.g., the configuration was set to not terminate the process in response to detection of token stealing), no preventions regarding token stealing will be raised on account of this process anymore and will log the prevention. Otherwise, in cases where a prevention is raised, then the configured prevention operation is performed (e.g., kill the process, monitor and log the process activity, alert a system/network/security administrator, and/or alert the user).

If a prevention is raised, as mentioned above, the source process is the malicious process. In this example implementation, the matching privileged process's full path and PID, if known, appear in the additional info field of the prevention. The target process for the prevention can be set in the following example two cases. The first case is if the malicious process was recognized while creating a new process. In this case, the new process will be the target process in the prevention, and the prevention will terminate the new process. The second case is if the malicious process was recognized while creating a new thread. In this case, if the new thread is in another process, the other process will be the target process in the prevention, and the prevention will terminate the new thread. For example, when a token stealing prevention is raised based on a new process creation (e.g., with Terminate=1), the anti-token stealing module can have priority over any other security check performed (e.g., including process control, and no other preventions may be raised for the old and new process in this example implementation).

In this example implementation, a prevention of token stealing can be raised once at most per a source process. When the user alert/notification configuration setting is on, the prevention can be displayed in the malicious process original session (e.g., regardless of the privileged process's session). If the malicious process original session was a no-GUI session, then no prevention will be displayed. Specific status and prevention descriptions can be displayed per the action the malicious process was caught doing during the identification. Below are example accompanied prevention descriptions for different actions:

(1) Process creation: attempted token theft and execution of a new process;
(2) Thread creation: attempted token theft and execution of a new thread;
(3) Thread injection: attempted token theft and injection of a new thread;
(4) Files: attempted token theft and a file system action; and
(5) Registry: attempted token theft and a registry action.

Example Policy and Configuration Settings for Anti-Token Stealing

Below are example token stealing statuses that can be monitored and detected by the endpoint agent using the above-described PEP techniques.
STATUS_TOKEN_THEFT_PROCESS_CREATED: Source and Target
STATUS_TOKEN_THEFT_THREAD_CREATED: Source only
STATUS_TOKEN_THEFT_THREAD_INJECTED: Source and Target
STATUS_TOKEN_THEFT_REGISTRY_OPERATION: Source only
STATUS_TOKEN_THEFT_FILE_OPERATION: Source only Below are example policy configuration settings for the token stealing feature that can be performed using the above-described PEP techniques. In an example implementation, a registry configuration for anti-token stealing can include the following values, per source process:

(1) Enable (DWORD): a nonzero value if the security module should be enabled for this privileged process;

(2) Terminate (DWORD): 1 for terminating the malicious process/0 for not terminating;
(3) UserNotification (DWORD): a nonzero value if a user notification should be shown upon prevention; and
(4) Whitelist (MULTI_SZ): a list of full path patterns in the whitelist.

In this example implementation, the Whitelist semantic meaning is "which processes this source process, is allowed to steal from." For example, if "notepad.exe" has a whitelist that includes a path of "c:\windows\system32\winlogon.exe," then notepad.exe is allowed to be found with a token matching that of a winlogon.exe process.

The disclosed techniques for performing privilege escalation protection can be performed without risk in security enhancements for Microsoft Windows that would block the above-described techniques. Also, the disclosed anti-token stealing techniques for performing privilege escalation protection also result in a low false positive (FP) detection rate.

Figure 2:
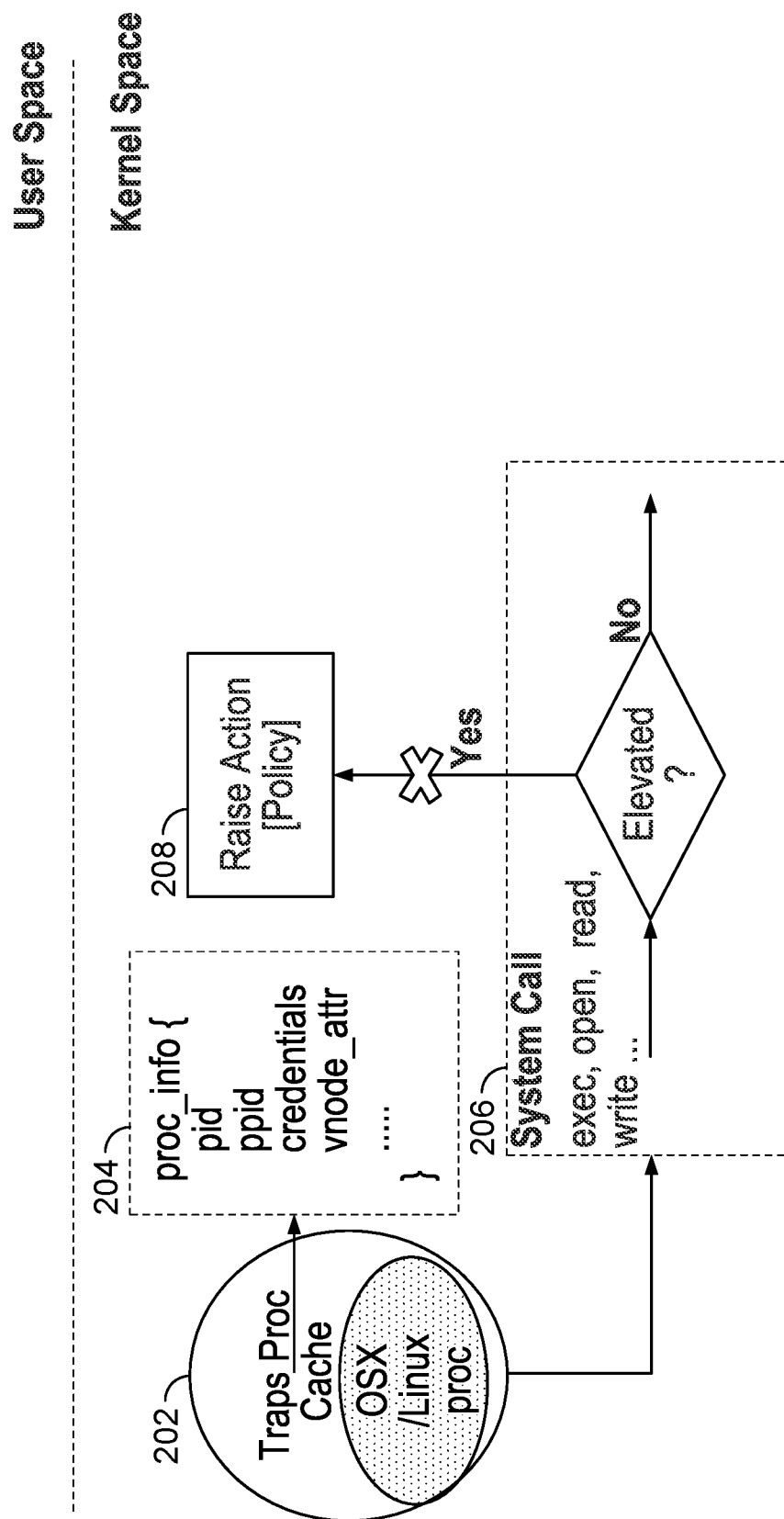
FIG. 2 is another diagram of a system for performing privilege escalation protection in accordance with some embodiments.

FIG. 2 is another diagram of a system for performing privilege escalation protection in accordance with some embodiments. As shown, FIG. 2 provides an example workflow and components of a system for performing kernel-based privilege escalation protection in accordance with some embodiments. In some embodiments, the disclosed system is implemented as a module/component of an endpoint agent (e.g., a user mode application executed on the endpoint device), such as similarly described above with respect to FIG. 1. In an example implementation, the endpoint agent can be provided by a lightweight agent (e.g., a commercially available endpoint agent, such as the Palo Alto Networks® Traps™ agent available from Palo Alto Networks, Inc., which is a highly scalable, lightweight agent for endpoint security) that can be executed on, for example, a variety of different client/host device platforms (e.g., Microsoft® Windows® OS platforms for clients and/or servers, and/or on other OS platforms, such as the Apple Mac® OS, Apple iOS®, and/or Linux OS) to facilitate endpoint security and kernel-based privilege escalation protection, such as further described below.

Referring to FIG. 2, an example workflow for performing kernel-based privilege escalation protection on Apple Mac OS and iOS and Linux OS environments will now be described in accordance with some embodiments. As shown, the PEP implementation executes in kernel space on the native OS environment (e.g., Apple Mac OS, iOS, and Linux OS environments) and includes a process behavioral credentials cache 202 (e.g., shown as Traps process cache for OSX/Linux processes) for caching stored process credentials and tracking processed credential changes. Specifically, the process behavior credentials cache maintains a cache of all processes executing on the system along with their credentials and process tree (e.g., parents and its children). An example of the information that is tracked and cached/stored is shown at 204, which includes the following example process information: pid (process ID), ppid (parent process ID), credentials (process credentials), and vnode (virtual node) attribute (e.g., file operations, etc.).

At 206, a system call (e.g., execute, open, read, write a file, and/or other operations) determines whether the process credentials have been elevated (e.g., using the process cache to determine an elevated process credentials for the relevant process). If not, then no action is performed as shown. If so, then a raise prevention action is shown at 208 (e.g., perform an action/response based on a configuration/policy), such as similarly described above. Specifically, the credential changes can be inspected upon system call (syscall) context. For example, if the inspection determines that a process A started with UID=500 and then later performs a syscall with UID=0, then whether the escalation is legal/authorized can be checked. If it is not legal/authorized (e.g., depends on the OS environment, such as the examples described above with respect to the Microsoft Windows OS), then the syscall can be blocked based on a policy (e.g., policy configuration/setting) and thus prevent the syscall from being performed with the escalation in privilege for the process as shown at 208 (e.g., malicious process attempting a syscall with a privilege escalation).

As such, the disclosed example workflow for performing kernel-based privilege escalation protection on Apple Mac OS and iOS and Linux OS environments can detect illegal/unauthorized process credential changes.

As will now be further described below, such illegal/unauthorized process credential changes can be achieved by using an OS kernel exploit (e.g., for the respective OS environment, such as Microsoft Windows OS, Apple Mac OS and iOS, and Linux OS).

Example OS Kernel Exploits Detected and Prevented Using PEP Techniques

There are many known OS kernel exploits on different OS environments. Example OS kernel exploits will be described below. Such OS kernel exploits that facilitate privilege escalations by malware can be detected and prevented using the above-described techniques for privilege escalation protection on such OS environments.

For example, CVE-2016-5195 (see https://nvd.nist.gov/vuln/detail/CVE-2016-5195) is an example vulnerability in the Linux OS kernel that allows local users (e.g., attackers) to gain privileges by leveraging incorrect handling of a copy-on-write (COW) feature to write to a read-only memory mapping, as exploited in the wild in the Fall of 2016 (e.g., also known as "Dirty COW").

As another example, CVE-2016-1828 (see https://nvd.nist.gov/vuln/detail/CVE-2016-1828) is an example vulnerability in the Apple iOS kernel that allows local users (e.g., attackers) to execute arbitrary code in a privileged context or cause a denial of service (memory corruption) via a crafted app/process (e.g., malware).

Specifically, the above-described OS kernel exploits can exploit the kernel (e.g., Apple iOS kernel or Linux kernel) by an attacker via a user mode/space tool that leverages the kernel vulnerability. The tool to be executed by a process will start with an ordinary UID value of UID=500 (e.g., a non-privileged process on Mac OS/iOS and/or Linux). Exploiting the kernel, the tool will get a high privileged UID value of UID=0. The tool will later call syscall, for example, to create child process, via fork( ) in Mac OS/iOS and/or Linux. The child process will inherit the high privileged UID value of UID=0 from the parent process. In this case, given that the endpoint agent (e.g., Traps agent) provisions each and every process in the system and performs credential integrity on each of the processes at the syscall level/trigger or checkpoint, the endpoint agent can detect such a privilege escalation activity (e.g., given that the parent was associated with an ordinary UID value of UID=500 and forked a child with a high privileged UID value of UID=0). As a result, the endpoint agent can detect such a privilege escalation and kill both the parent and its children processes in the fork syscall context based on a configuration setting/policy (e.g., as described above with respect to FIG. 2). Thus, the disclosed techniques can be performed to prevent privilege escalations that attempt to utilize such OS kernel exploits (e.g., on Apple Mac OS and iOS kernel or Linux kernel environments) for executing malware/malicious or otherwise unauthorized activities on endpoints, servers, or other computing devices.

As yet another example, CVE-2015-1701 (see https://github.com/hfiref0x/CVE-2015-1701; see also https://github.com/hfiref0x/CVE-2015-1701 and https://www.rapid7.com/db/modules/exploit/windows/local/ms15_051_client_copy_image) is an example vulnerability in the Microsoft Windows OS kernel (e.g., Microsoft Windows Server 2003 SP2, Vista SP2, and Server 2008 SP2) that exploits improper object handling in the win32k.sys kernel mode driver, which allows local users (e.g., attackers) to later use a shellcode to modify a process token into SYSTEM in order to gain privileges via a crafted application/process (e.g., malware) (e.g., table payload exploits local privilege escalation (CVE-2015-1701) to steal SYSTEM token; this vulnerability (also known as Win32k Elevation of Privilege Vulnerability) is reported to have been used in the wild, see https://www.fireeye.com/blog/threat-research/2015/04/probable_apt28_useo.html).

As similarly described above, the endpoint agent can detect such a privilege escalation on a Microsoft Windows OS environment and can perform an action in response based on a configuration setting/policy (e.g., as described above with respect to FIG. 1). Thus, the disclosed techniques can be performed to prevent privilege escalations that attempt to utilize such OS kernel exploits (e.g., on Microsoft Windows OS environments) for executing malware/malicious or otherwise unauthorized activities on endpoints, servers, or other computing devices.

As will now be apparent, the disclosed PEP techniques can be implemented on various OS environments on endpoint devices including those described above and can be similarly implemented on various other OS environments, including mobile, desktop, and server computing devices as well as cloud-based computing environments.

Figure 3:
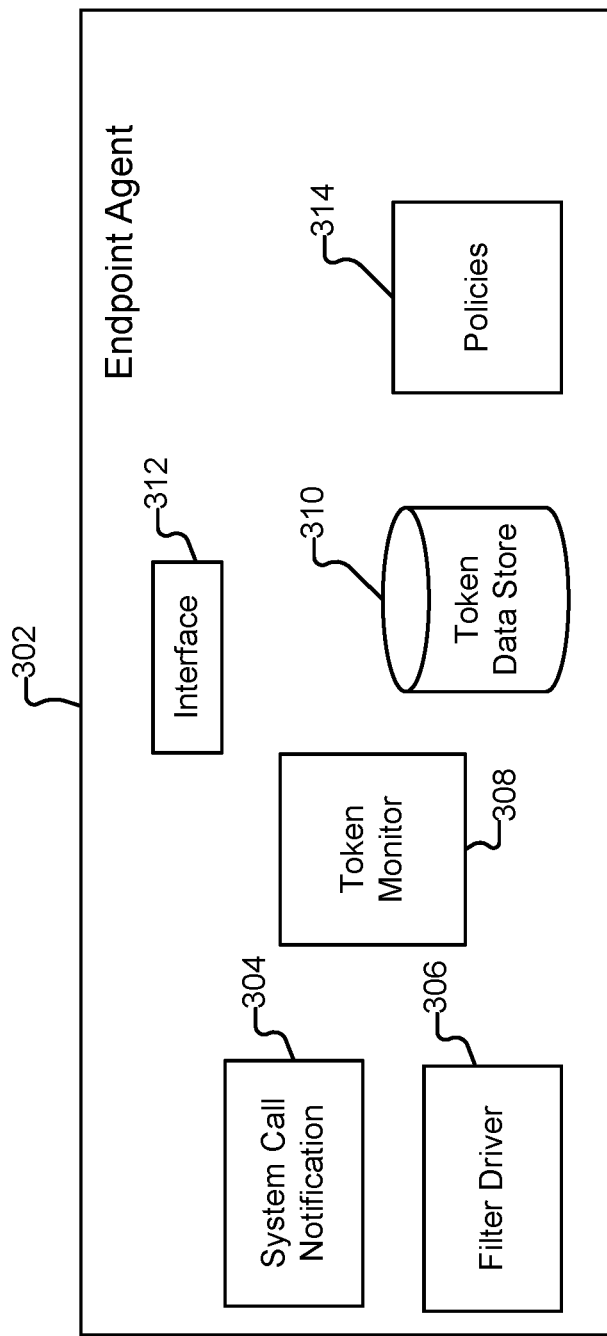
FIG. 3 is a component diagram of an endpoint agent for performing privilege escalation protection in accordance with some embodiments.

Component Diagram of an Endpoint Agent for Providing Privilege Escalation Protection FIG. 3 is a component diagram of an endpoint agent for performing privilege escalation protection in accordance with some embodiments. As shown, FIG. 3 provides example components/modules of an endpoint agent for performing kernel-based privilege escalation protection in accordance with some embodiments. In some embodiments, the disclosed system is implemented as a module/component of an endpoint agent (e.g., a user mode application executed on the endpoint device), such as similarly described above with respect to FIGS. 1 and 2. In an example implementation, the endpoint agent can be provided by a lightweight agent (e.g., a commercially available endpoint agent, such as the Palo Alto Networks® Traps™ agent available from Palo Alto Networks, Inc., which is a highly scalable, lightweight agent for endpoint security) that can be executed on, for example, a variety of different client/host device platforms (e.g., Microsoft® Windows® OS platforms for clients and/or servers, and/or on other OS platforms, such as the Apple Mac® OS, Apple iOS, and/or Linux OS) to facilitate endpoint security and kernel-based privilege escalation protection, such as further described below.

Referring to FIG. 3, an endpoint agent 302 includes various components (e.g., modules implemented in executable code) for implementing the disclosed PEP techniques. For example, the endpoint agent can be implemented using one or more high level programming languages (e.g., Python, C, Java, C++, C#, R, JavaScript, PHP, Go, Swift, and/or other programming languages and/or in various programmable hardware/ASIC or other components). As shown, endpoint agent 302 includes a plurality of modules that include the executable code for performing the disclosed PEP techniques as will now be further described.

As shown in FIG. 3, endpoint agent 302 includes an example module to perform system call/event monitoring as similarly described above with respect to FIGS. 1 and 2 implemented using a system call notification module 304 (e.g., for the following example system event notifications: kernel registry callback, process notification, and thread notification as similarly described above). Endpoint agent 302 also includes an example module to perform file monitoring as similarly described above with respect to FIGS. 1 and 2 implemented using a filter driver 306. Both modules 304 and 306 facilitate the token monitoring implemented by token monitor 308, and may have a flow which results in preventions as similarly described above with respect to FIGS. 1 and 2. Another example module can include the code and data store for generating and maintaining the token cache as similarly described above with respect to FIGS. 1 and 2, which is provided by token data store 310. An interface module 312 (e.g., user interface, such as GUI, command line interface, and/or other interface design, which can facilitate configuration of policy settings, provide user alerts, and access to log files of monitored processes as similarly described herein) is another example module that provides the interface functionality as similarly described above with respect to FIGS. 1 and 2 and further described below with respect to FIGS. 4A and 4B. As also shown in FIG. 3, another example module includes a configuration/policy module for the privilege escalation prevention provided by the endpoint agent as similarly described above with respect to FIGS. 1 and 2, which is implemented by policies 314. As will now be apparent, various other components/modules and architectures can similarly be implemented to perform the disclosed PEP techniques.

User Interface Embodiments for Providing Privilege Escalation Protection

Figure 4A:
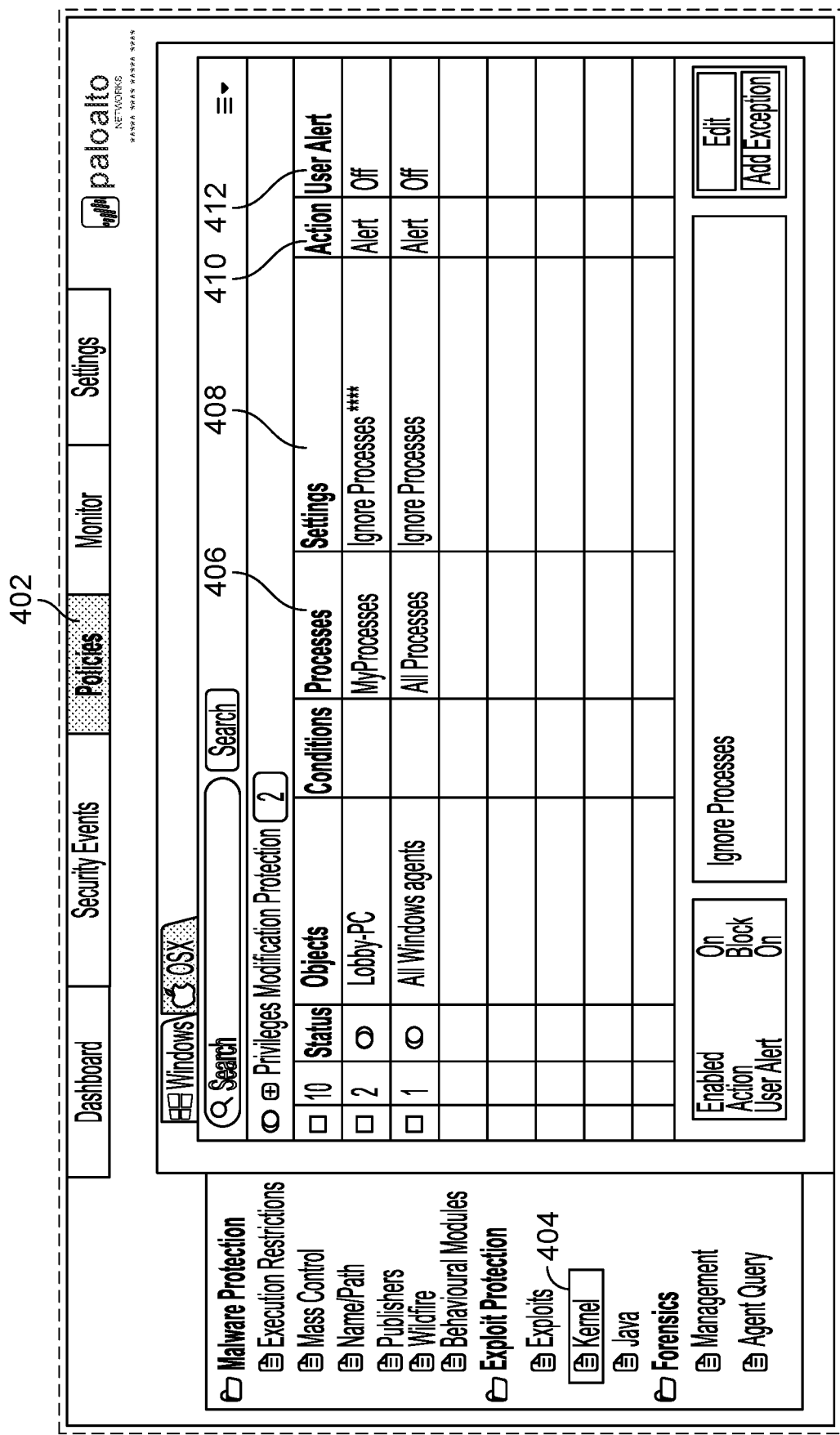

FIGS. 4A and 4B are diagrams of a user interface for performing privilege escalation protection in accordance with some embodiments. As shown, FIGS. 4A and 4B provide an example graphical user interface (GUI) for configuring a policy for kernel-based privilege escalation protection in accordance with some embodiments. In some embodiments, the disclosed system is implemented as a module/component of an endpoint agent (e.g., a user mode application executed on the endpoint device), such as similarly described above with respect to FIGS. 1 and 2. In an example implementation, the endpoint agent can be provided by a lightweight agent (e.g., a commercially available endpoint agent, such as the Palo Alto Networks® Traps™ agent available from Palo Alto Networks, Inc., which is a highly scalable, lightweight agent for endpoint security) that can be executed on, for example, a variety of different client/host device platforms (e.g., Microsoft® Windows® OS platforms for clients and/or servers, and/or on other OS platforms, such as the Apple Mac® OS, Apple iOS, and/or Linux OS) to facilitate endpoint security and kernel-based privilege escalation protection, such as further described below.

As similarly described above, an endpoint agent can be implemented that performs the disclosed techniques for privilege escalation protection. In an example implementation, the endpoint agent can also include a user interface/GUI to allow users to create or edit rules for policies for privilege escalation/modification protection (e.g., block, alert, exclude configuration settings and a whitelist). Configuration/policy settings can be distributed to deployed agents using a heartbeat or other update mechanisms for agents deployed across a network (e.g., an enterprise and/or cloud-based network of computing devices).

Referring to FIG. 4A, the user interface/GUI includes a policies tab 402, kernel directory 404 under the exploit protections directory, and a screen that includes configurable rules for the target devices (e.g., groups or individual devices that have the deployed endpoint agents), such as for processes 406, settings 408, actions 410, and user alert 412.

Referring to FIG. 4B, the user interface/GUI includes a settings tab 420, an action pull down menu 422, and an exclusions configuration screen 424 (e.g., a fully specified path of executable processes configured in the exclusions from these configuration settings/actions for privilege modification protection).

As will now be apparent, the disclosed privilege escalation/modification protection techniques can be implemented using various user interfaces/GUI designs on various OS environments on endpoint devices including those described above and can be similarly implemented on various other OS environments, including mobile, desktop, and server computing devices as well as cloud-based computing environments.

Additional example processes for the disclosed techniques for performing privilege escalation protection will now be described.

Process Embodiments for Providing Privilege Escalation Protection

Figure 5:
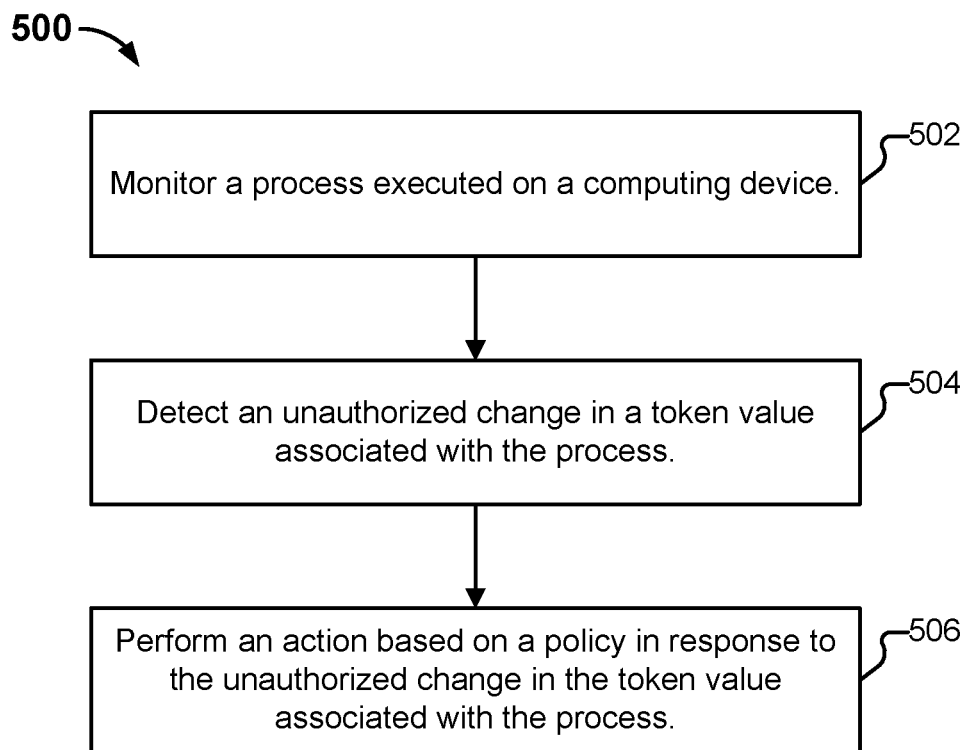
FIG. 5 is a flow diagram of a process for performing privilege escalation protection in accordance with some embodiments.

FIG. 5 is a flow diagram of a process for performing privilege escalation protection in accordance with some embodiments. In some embodiments, a process 500 as shown in FIG. 5 is performed by the security platform and techniques as similarly described above including the embodiments described above with respect to FIGS. 1-4B. In one embodiment, process 500 is performed by an endpoint agent/module as described above with respect to FIGS. 1-3, as similarly described above.

The process begins at 502. At 502, monitoring a process executed on a computing device is performed. For example, an endpoint device can monitor processes executed on an endpoint device (e.g., to track token values/IDs associated with each of the processes, which can be cached/stored in a token cache) as similarly described above.

At 504, detecting an unauthorized change in a token value associated with the process is performed. For example, the unauthorized change in the token value associated with the process can be determined using the PEP techniques as similarly described above.

At 506, performing an action based on a policy in response to the unauthorized change in the token value associated with the process is performed. For example, a protection action/response can be performed based on the policy, such as killing the process, alerting the user, and/or monitoring the process and logging the process activities monitored on the endpoint device as similarly described above.

Figure 6:
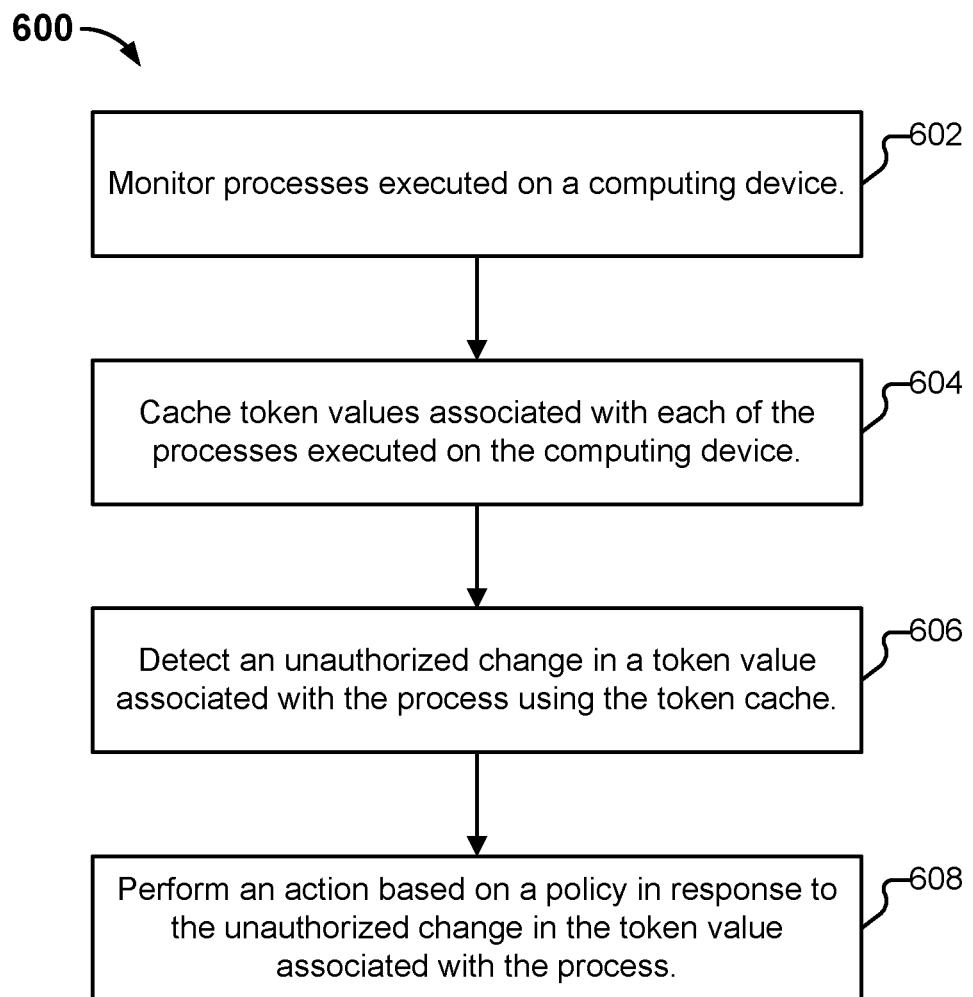
FIG. 6 is another flow diagram of a process for performing privilege escalation protection in accordance with some embodiments.

FIG. 6 is another flow diagram of a process for performing privilege escalation protection in accordance with some embodiments. In some embodiments, a process 600 as shown in FIG. 6 is performed by the security platform and techniques as similarly described above including the embodiments described above with respect to FIGS. 1-4B. In one embodiment, process 600 is performed by an endpoint agent/module as described above with respect to FIGS. 1-3, as similarly described above.

The process begins at 602. At 602, monitoring a process executed on a computing device is performed. For example, an endpoint device can monitor processes executed on an endpoint device (e.g., to track token values/IDs associated with each of the processes, which can be cached/stored in a token cache) as similarly described above.

At 604, caching token values associated with each of the processes executed on the computing device is performed. For example, the token cache can cache/store token values/IDs and other information associated with each of the processes executed on the computing device as similarly described above.

At 606, detecting an unauthorized change in a token value associated with the process using the token cache is performed. For example, the unauthorized change in the token value associated with the process can be determined using the PEP techniques (e.g., to detect a token stealing activity to facilitate privilege escalation for a malicious process by changing a frozen token value/ID to that of a kernel process executed on the OS environment) as similarly described above.

At 608, performing an action based on a policy in response to the unauthorized change in the token value associated with the process is performed. For example, a protection action/response can be performed based on the policy, such as killing the process, alerting the user, and/or monitoring the process and logging the process activities monitored on the endpoint device as similarly described above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
detect an unauthorized change in a cached initial token value associated with a process executed on a computing device, wherein the cached initial token value is checked for changes in response to a trigger event in order to detect an unauthorized change to the initial token value or to detect a stealing of the token by another process executed on the computing device, wherein the initial token value is cached in a data store for caching stored process credentials and tracking processed credential changes, and wherein the data store maintains a cache of processes executing on the computing device along with their credentials and process tree; and
perform an action based on a policy in response to the unauthorized change in the cached initial token value associated with the process to facilitate detection of a token stealing operation after it is completed but before any privileged user mode operation is executed in user mode, wherein the policy comprises a whitelisted set of processes, and wherein the performing of the action comprises to compare the process with one or more processes of the whitelisted set of processes to determine whether to perform the action; and
a memory coupled to the processor and configured to provide the processor with instructions.

2. The system of claim 1, wherein the trigger event includes a new process creation, a thread creation, a registry operation, a file operation, or any combination thereof.

3. The system of claim 1, wherein the processor is further configured to:
detect an attempt to change the cached initial token value associated with the process to a value that is associated with another process executed on the computing device.

4. The system of claim 1, wherein the processor is further configured to:
detect an attempt to change the cached initial token value associated with the process to a value that is associated with another process executed on the computing device that has kernel privileges.

5. The system of claim 1, wherein the processor is further configured to:
perform a privilege escalation protection action based on the policy in response to the unauthorized change in the cached initial token value associated with the process, wherein the privilege escalation protection action comprises one or more of the following: killing the process, generating an alert, and/or logging activities associated with the process monitored on the computing device.

6. The system of claim 1, wherein the processor is further configured to:
kill the process based on the policy in response to the unauthorized change in the cached initial token value associated with the process.

7. The system of claim 1, wherein the processor is further configured to:
generate an alert based on the policy in response to the unauthorized change in the cached initial token value associated with the process.

8. The system of claim 1, wherein the processor is further configured to:
generate a user interface for configuring and viewing security events triggered by privilege escalation related activities.

9. A method, comprising:
detecting an unauthorized change in a cached initial token value associated with a process executed on a computing device, wherein the cached initial token value is checked for changes in response to a trigger event in order to detect an unauthorized change to the initial token value or to detect a stealing of the token by another process executed on the computing device, wherein the initial token value is cached in a data store for caching stored process credentials and tracking processed credential changes, and wherein the data store maintains a cache of processes executing on the computing device along with their credentials and process tree; and
performing an action based on a policy in response to the unauthorized change in the cached initial token value associated with the process to facilitate detection of a token stealing operation after it is completed but before any privileged user mode operation is executed in user mode, wherein the policy comprises a whitelisted set of processes, and wherein the performing of the action comprises to compare the process with one or more processes of the whitelisted set of processes to determine whether to perform the action.

10. The method of claim 9, wherein the trigger event includes a new process creation, a thread creation, a registry operation, a file operation, or any combination thereof.

11. The method of claim 9, further comprising detecting an attempt to change the cached initial token value associated with the process to a value that is associated with another process executed on the computing device.

12. The method of claim 9, further comprising detecting an attempt to change the cached initial token value associated with the process to a value that is associated with another process executed on the computing device that has kernel privileges.

13. The method of claim 9, further comprising performing a privilege escalation protection action based on the policy in response to the unauthorized change in the cached initial token value associated with the process, wherein the privilege escalation protection action comprises one or more of the following: killing the process, generating an alert, and/or logging activities associated with the process monitored on the computing device.

14. The method of claim 9, further comprising killing the process based on the policy in response to the unauthorized change in the cached initial token value associated with the process.

15. The method of claim 9, further comprising generating an alert based on the policy in response to the unauthorized change in the cached initial token value associated with the process.

16. The method of claim 9, further comprising generating a user interface for configuring and viewing security events triggered by privilege escalation related activities.

17. A computer program product, the computer program product being embodied in a non-transitory tangible computer readable storage medium and comprising computer instructions for:
detecting an unauthorized change in a cached initial token value associated with a process executed on a computing device, wherein the cached initial token value is checked for changes in response to a trigger event in order to detect an unauthorized change to the initial token value or to detect a stealing of the token by another process executed on the computing device, wherein the initial token value is cached in a data store for caching stored process credentials and tracking processed credential changes, and wherein the data store maintains a cache of processes executing on the computing device along with their credentials and process tree; and
performing an action based on a policy in response to the unauthorized change in the cached initial token value associated with the process to facilitate detection of a token stealing operation after it is completed but before any privileged user mode operation is executed in user mode, wherein the policy comprises a whitelisted set of processes, and wherein the performing of the action comprises to compare the process with one or more processes of the whitelisted set of processes to determine whether to perform the action.

18. The computer program product recited in claim 17, wherein the trigger event includes a new process creation, a thread creation, a registry operation, a file operation, or any combination thereof.

19. The computer program product recited in claim 17, further comprising computer instructions for detecting an attempt to change the cached initial token value associated with the process to a value that is associated with another process executed on the computing device.

20. The computer program product recited in claim 17, further comprising computer instructions for detecting an attempt to change the cached initial token value associated with the process to a value that is associated with another process executed on the computing device that has kernel privileges.

21. The computer program product recited in claim 17, further comprising computer instructions for performing a privilege escalation protection action based on the policy in response to the unauthorized change in the cached initial token value associated with the process, wherein the privilege escalation protection action comprises one or more of the following: killing the process, generating an alert, and/or logging activities associated with the process monitored on the computing device.

22. The computer program product recited in claim 17, further comprising computer instructions for killing the process based on the policy in response to the unauthorized change in the cached initial token value associated with the process.

23. The computer program product recited in claim 17, further comprising computer instructions for generating an alert based on the policy in response to the unauthorized change in the cached initial token value associated with the process.

24. The computer program product recited in claim 17, further comprising computer instructions for generating a user interface for configuring and viewing security events triggered by privilege escalation related activities.

* * * * *